United States Patent
Barrows (10) Patent No.: US 10,427,799 B2
(45) Date of Patent: Oct. 1, 2019

(54) TRIMMING DEVICE FOR CONTROLLING THE GLIDE SLOPE AND DESCENT SPEED OF A PARAFOIL

(71) Applicant: The Charles Stark Draper Laboratory, Inc., Cambridge, MA (US)

(72) Inventor: Timothy Barrows, Newton, MA (US)

(73) Assignee: The Charles Stark Draper Laboratory, Inc., Cambridge, MA (US)

(*) Notice: Subject to any disclaimer, the term of this patent is extended or adjusted under 35 U.S.C. 154(b) by 131 days.

(21) Appl. No.: 15/408,685

(22) Filed: Jan. 18, 2017

(65) Prior Publication Data

US 2017/0210479 A1    Jul. 27, 2017

Related U.S. Application Data

(60) Provisional application No. 62/286,074, filed on Jan. 22, 2016.

(51) Int. Cl.
*B64D 17/34* (2006.01)
*B64D 1/12* (2006.01)
(Continued)

(52) U.S. Cl.
CPC .............. *B64D 17/343* (2013.01); *B64D 1/08* (2013.01); *B64D 1/12* (2013.01); *B64D 17/025* (2013.01); *B64D 17/24* (2013.01); *G05D 1/105* (2013.01)

(58) Field of Classification Search
CPC ........ B64D 17/343; B64D 17/24; B64D 1/08; B64D 1/12; B64D 17/025; G05D 1/105; B64C 31/036
See application file for complete search history.

(56) References Cited

U.S. PATENT DOCUMENTS 3,433,441 A * 3/1969 Cummings ........... B64C 31/036
                                                244/138 R
5,678,788 A * 10/1997 Hetzer ................. B64D 17/025
                                                244/138 R
(Continued)

FOREIGN PATENT DOCUMENTS

DE        4433211 C1    1/1996
DE       19634017 A1    2/1998
WO   WO 2010/130043 A1  11/2010

OTHER PUBLICATIONS

Slegers, Nathan. "Use of Variable Incidence Angle for Glide Slope Control of Autonomous Parafoils" May 2008.*
(Continued)

*Primary Examiner* — Nadeem Odeh
*Assistant Examiner* — Michael V Kerrigan
(74) *Attorney, Agent, or Firm* — Christopher J. McKenna; Foley & Lardner LLP (57) ABSTRACT

A parafoil system having an adjustable trim angle during flight to control glide slope and descent speed of a parafoil is provided. The parafoil system may include a pulley cluster comprising first and second variable trim pulleys, each having a different diameter. The pulley cluster may be coupled to forward and aft suspension lines of a parafoil canopy such that the pulley cluster may rotate to retract or extend the forward and aft suspension lines to adjust the trim angle during flight. The parafoil system may further include a motor for rotating the pulley cluster to extend or retract the suspension lines to adjust the trim angle during flight. By adjusting the trim angle of the canopy during flight, the glide slope and descent speed of the parafoil system may be controlled.

15 Claims, 5 Drawing Sheets

(51) Int. Cl.
*B64D 17/02* (2006.01)
*B64D 1/08* (2006.01)
*B64D 17/24* (2006.01)
*G05D 1/10* (2006.01)

(56) References Cited

U.S. PATENT DOCUMENTS

| | | | |
|---|---|---|---|
| 6,808,144 B1* | 10/2004 | Nicolai | B64C 39/024 244/139 |
| 2007/0272801 A1 | 11/2007 | Patrick et al. | |
| 2013/0285377 A1* | 10/2013 | Tattersfield | F03D 5/06 290/44 |

OTHER PUBLICATIONS

International Search Report and Written Opinion for PCT/US2017/013907 dated Apr. 4, 2017.

* cited by examiner

TRIMMING DEVICE FOR CONTROLLING THE GLIDE SLOPE AND DESCENT SPEED OF A PARAFOIL

CROSS-REFERENCE TO RELATED APPLICATION

This application claims priority to U.S. Provisional Patent Application No. 62/286,074, filed on Jan. 22, 2016, the entire contents of which is incorporated herein by reference.

FIELD OF USE

This application generally relates to parafoil systems and apparatus having an adjustable trim angle during flight to control the glide slope and descent speed of the parafoil.

BACKGROUND

The following description is provided to assist the understanding of the reader. None of the information provided or references cited is admitted to be prior art. Controlling the glide slope and descent speed of a parafoil accurately is challenging as the design must be strong enough to withstand the opening shock during deployment of the parafoil canopy. For example, loads during parafoil canopy deployment may be five to ten times the weight of the payload.

SUMMARY

The glide slope and descent speed of a parafoil may be controlled to improve the accuracy with which the parafoil may be guided to a target. For example, military forces have an increasing reliance on autonomously guided airdrop for the resupply of troops. It would therefore be desirable to provide a parafoil system with improved airdrop accuracy.

The present disclosure overcomes the drawbacks of previously-known systems by providing a parafoil system having an adjustable trim angle during flight to control glide slope and descent speed of the parafoil. The system may include a canopy having a forward portion and an aft portion, a forward suspension line coupled to the forward portion of the canopy, and an aft suspension line coupled to the aft portion of the canopy.

The system may further include first and second pulleys, wherein the first pulley has a first diameter and the second pulley has a second diameter, and wherein the first diameter and the second diameter are different. For example, the second diameter may be larger than the first diameter. The forward suspension line may be coupled to the first pulley and the aft suspension line may be coupled to the second pulley. The system may also include a third pulley having a third diameter, wherein the third diameter is larger than the first diameter and smaller than the second diameter, and wherein at least one of the forward suspension line or the aft suspension line is coupled to the third pulley.

The system may further include a motor coupled to the first and second pulleys, wherein the motor rotates the first and second pulleys to extend or retract the forward suspension line or the aft suspension line to adjust the trim angle during flight. The motor may rotate the first and second pulleys as a single unit. In another embodiment, the motor may rotate the first pulley at a first speed and the second pulley at a second speed, wherein the first speed and the second speed are different. In addition, the motor may rotate the first and second pulleys to extend or retract a forward suspension line or an aft suspension line, coupled to a left side of the canopy, to adjust the trim angle of the left side of the canopy during flight. Accordingly, the parafoil system may further include a second motor coupled to third and fourth pulleys, wherein the second motor rotates the third and fourth pulleys to extend or retract a forward suspension line or an aft suspension line, coupled to a right side of the canopy, to adjust the trim angle of the right side of the canopy during flight. As such, the motor and the second motor may operate in unison to adjust the trim angle of the right and the left sides of the canopy equally. The motor and the second motor may also operate differentially to steer the parafoil.

The system may further include a housing sized and shaped to house the first and second pulleys and the motor. The system may also include a power source operatively coupled to the motor, wherein the power source powers the motor. The system may also include a processor operatively coupled to the motor, and a non-transitory computer readable medium having instructions stored thereon, wherein the instructions, when executed by the processor, cause the motor to rotate the first and second pulleys. The system may further include at least one of an accelerometer, gyroscope, magnetometer, global positioning system, or barometric altimeter, operatively coupled to the processor.

The first and second pulleys and the motor may be mounted on a structure. The structure may be mounted on a payload. In one embodiment, at least one of the forward or aft suspension lines closest to the center of pressure of the canopy may be coupled directly to the structure. The system may further include an additional suspension line coupled to the forward portion or the aft portion, wherein the additional suspension line is further coupled to a fixed point of the structure.

In accordance with another aspect of the present disclosure, an apparatus for adjusting a trim angle during flight to control glide slope and descent speed of a parafoil is provided. The apparatus may include first and second pulleys coupled to suspension lines of a parafoil, wherein the first pulley has a first diameter and the second pulley has a second diameter, and wherein the first diameter and the second diameter are different. The apparatus may further include a motor coupled to the first and second pulleys, wherein the motor rotates the first and second pulleys to extend or retract the suspension lines to adjust the trim angle during flight.

In accordance with yet another aspect of the present disclosure, a system for adjusting a trim angle during flight to control glide slope and descent speed of a parafoil is provided. The system may include first and second pulleys coupled to suspension lines of a parafoil, wherein the first pulley has a first diameter and the second pulley has a second diameter, and wherein the first diameter and the second diameter are different. The system may further include a motor coupled to the first and second pulleys, and a processor operatively coupled to the motor, wherein the processor causes the motor to rotate the first and second pulleys to extend or retract the suspension lines to adjust the trim angle during flight.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

The parafoil systems described herein may work with autonomously guided parafoils and manned parafoils.

DETAILED DESCRIPTION

The parafoil system for adjusting the trim angle of a parafoil during flight to control the glide slope and descent speed of the parafoil comprises variable trim pulleys. The system further includes a motor for rotating the variable trim pulleys. In accordance with the principles of the present disclosure, the system disclosed herein may be utilized with autonomously guided parafoils and manned parafoils.

Figure 1:
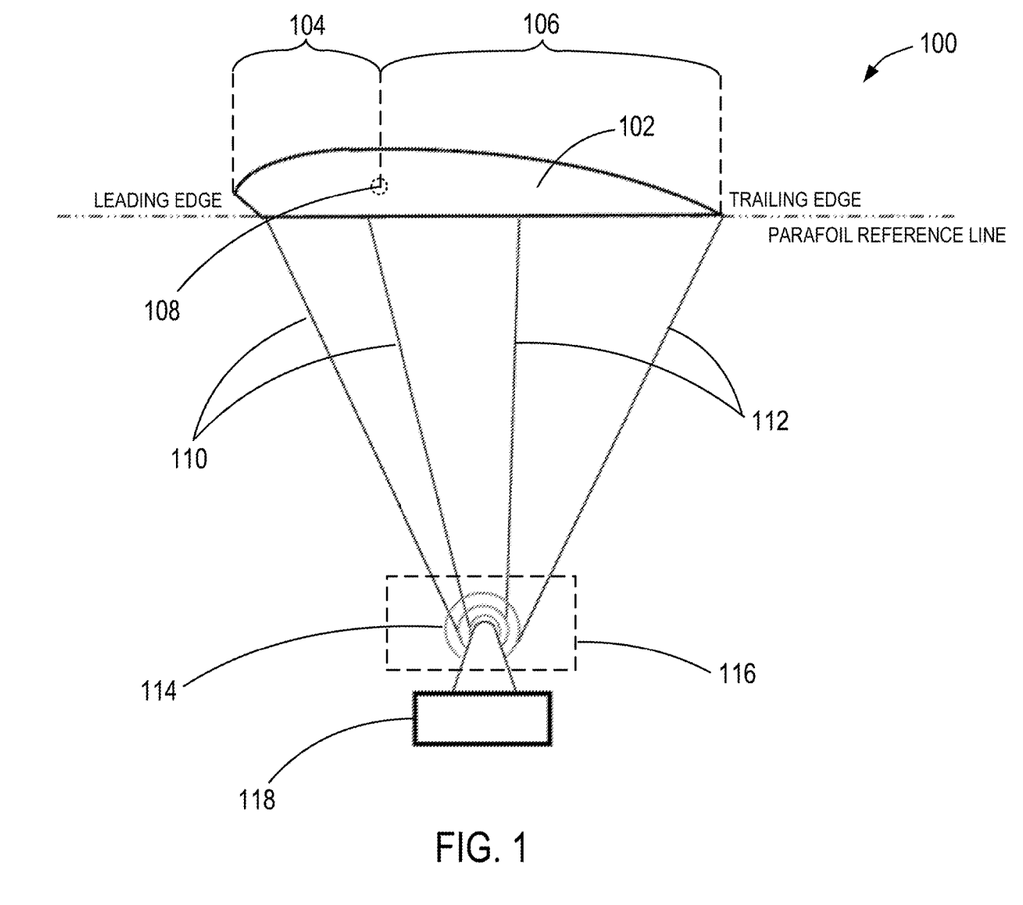
FIG. 1 is a schematic of an exemplary parafoil system with variable trim pulleys constructed in accordance with the principles of the present disclosure.

Referring to FIG. 1, an exemplary parafoil system with variable trim pulleys constructed in accordance with the principles of the present disclosure is described. Parafoil system 100 comprises canopy 102, forward suspension lines 110, aft suspension lines 112, pulley cluster 114, housing 116, and payload 118. Canopy 102 may be of a generally well-known type. For example, canopy 102 may have forward portion 104, aft portion 106, and aerodynamic center 108. As will be understood by one skilled in the art, aerodynamic center 108 of canopy 102 is the point along canopy 102 at which the pitching moment does not vary with a change in the angle of attack of canopy 102. The aerodynamic center is typically 25% of the chord position of the canopy. As such, canopy 102 pitches, e.g., upward or downward, about aerodynamic center 108 of canopy 102, and aerodynamic center 108 is more or less fixed relative to the pulleys during flight. Forward portion 104 is defined as the points along canopy 102 between aerodynamic center 108 and the leading edge of canopy 102, and aft portion 106 is defined as the points along canopy 102 between aerodynamic center 108 and the trailing edge of canopy 102.

Canopy 102 may transition from a collapsed state, prior to deployment, to an inflated state upon deployment and during flight wherein canopy 102 has an airfoil shape. In a preferred embodiment, canopy 102 may include a leading edge inlet at the leading edge of canopy 102 which permits an inflow of air to internally pressurize and inflate canopy 102 to an airfoil shape. As understood by one of ordinary skill in the art, canopy 102 may be sized and shaped as necessary to support a payload of a given size during flight and to deliver the payload to a target location.

As shown in FIG. 1, forward suspension lines 110 may be coupled to forward portion 104 of canopy 102 and aft suspension lines 112 may be coupled to aft portion 106 of canopy 102. Additionally, the suspension lines may be coupled to the right and left sides of canopy 102 to provide an anhedral shape as described in further detail below. As understood by one of ordinary skill in the art, forward suspension lines 110 and aft suspension lines 112 may include more or less than two suspension lines coupled to canopy 102 along forward portion 104 and aft portion 106.

Forward suspension lines 110 and aft suspension lines 112 may be constructed of any well-known load bearing material designed to meet the load bearing requirements dictated by the size and shape of canopy 102 as will be understood by one skilled in the art.

As shown in FIG. 1, forward suspension lines 110 and aft suspension lines 112 may be coupled to pulley cluster 114. Pulley cluster 114 may include two or more variable trim pulleys, each having a different diameter as described in further detail below. In a preferred embodiment, the individual variable trim pulleys of pulley cluster 114 may be fused together so that they rotate together as a single unit. By judicious selection of each variable trim pulley diameter to which each suspension line is attached, a torsional balance on pulley cluster 114 as a whole may be achieved such that pulley cluster 114 may be rotated without a large torque. Selection of the diameter of each variable trim pulley may depend on the amount of tension experienced by the suspension line coupled to the respective pulley.

In another embodiment, the individual variable trim pulleys of pulley cluster 114 may be spaced apart and rotated at the same angular velocity. In yet another embodiment, the individual variable trim pulleys of pulley cluster 114 may each be rotated at different angular velocities. In such an embodiment, for example, the individual variable trim pulleys of pulley cluster 114 may be smaller and have similar diameters.

As shown in FIG. 1, pulley cluster 114 may be enclosed in housing 116. Pulley cluster 114 may be lighter and more compact in comparison to previous parafoil rigging systems such as a variable trim platform (VTP) as described in U.S. Patent Application No. 2012/0305713 to Deazley. A VTP comprises a large plate that is tilted relative to the payload. The VTP is coupled to the suspension lines of a parafoil system such that the tilting of the large plate may adjust the angle of attack of the parafoil. However, VTPs known in the art are large and heavy, and difficult to enclose in a housing since there must be room to permit the large plate to move through its entire range of tilt. Thus, there is less space available for other components, e.g., batteries and instruments.

Housing 116 of parafoil system 100 may be sized and shaped to house pulley cluster 114, and mechanism for actuating the rotation of pulley cluster 114 including a motor, a power source, and a processor as described in further detail below. Housing 116 may also house instruments such as an accelerometer, gyroscope, magnetometer, global positioning system, barometric altimeter, and any instrument one skilled in the art would understand as advantageous for an autonomously guided parafoil system. Housing 116 may be mounted on a structure, e.g., payload 118.

As described above, parafoil system 100 may deliver payload 118 to a target location. As will be understood by one skilled in the art, payload 118 may be any size and weight as may be delivered to a desired target by a parafoil system, and may include, for example, military equipment, vehicles, and supplies.

Figure 2A:
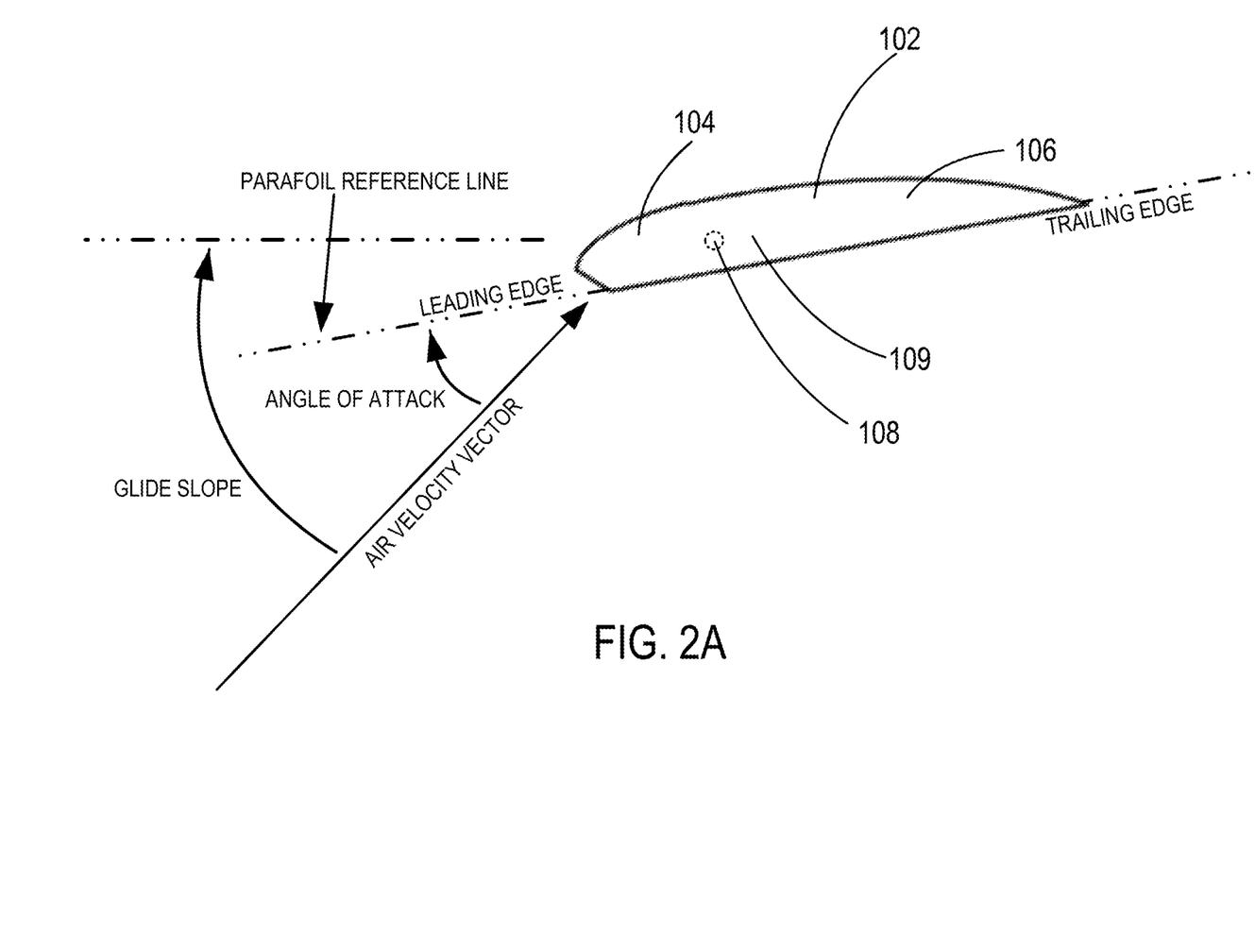
FIG. 2A illustrates the angle of attack of a parafoil during flight.

Referring now to FIG. 2A, the angle of attack of canopy 102 of parafoil system 100 during flight is described. As shown in FIG. 2A, the air velocity vector is defined in a coordinate frame that is fixed to canopy 102, e.g., the parafoil reference line is fixed to canopy 102. The angle of attack of canopy 102 is measured as the angle between the air velocity vector and the parafoil reference line. Thus, as the leading edge of canopy 102 pitches downward, the angle of attack of canopy 102 decreases, and as the leading edge of canopy 102 pitches upward, the angle of attack of canopy 102 increases. As will be understood by one skilled in the art, the lift of parafoil system 100 increases as the angle of attack of canopy 102 increases, and accordingly, the lift of parafoil system 100 decreases as the angle of attack of canopy 102 decreases.

As shown in FIG. 2A, the glide slope of parafoil system 100 is measured as the slope of the trajectory along which parafoil system 100 descends under equilibrium conditions. The glide slope (or more precisely the tangent of the glide slope) is inversely proportional to the lift to drag ratio (L/D). With a small glide slope, the range of flight of parafoil system 100 is increased for a given airdrop altitude. As glide slope increases, the range of flight of parafoil system 100 is decreased for a given airdrop altitude. Starting from a trim condition of minimum glide slope (maximum L/D), it may be desirable to increase the glide slope to decrease flight range of parafoil system 100 to avoid overshooting the target as parafoil system 100 approaches the target, e.g., comes within a predetermined range. Therefore, to increase the glide slope of parafoil system 100, canopy 102 is trimmed to a lower angle of attack, causing the leading edge of canopy 102 to pitch downward resulting in a corresponding decrease in lift. Similarly, to decrease the glide slope of parafoil system 100, canopy 102 is trimmed to a higher angle of attack, causing the leading edge of canopy 102 to pitch upward resulting in a corresponding increase in lift.

Figure 2B:
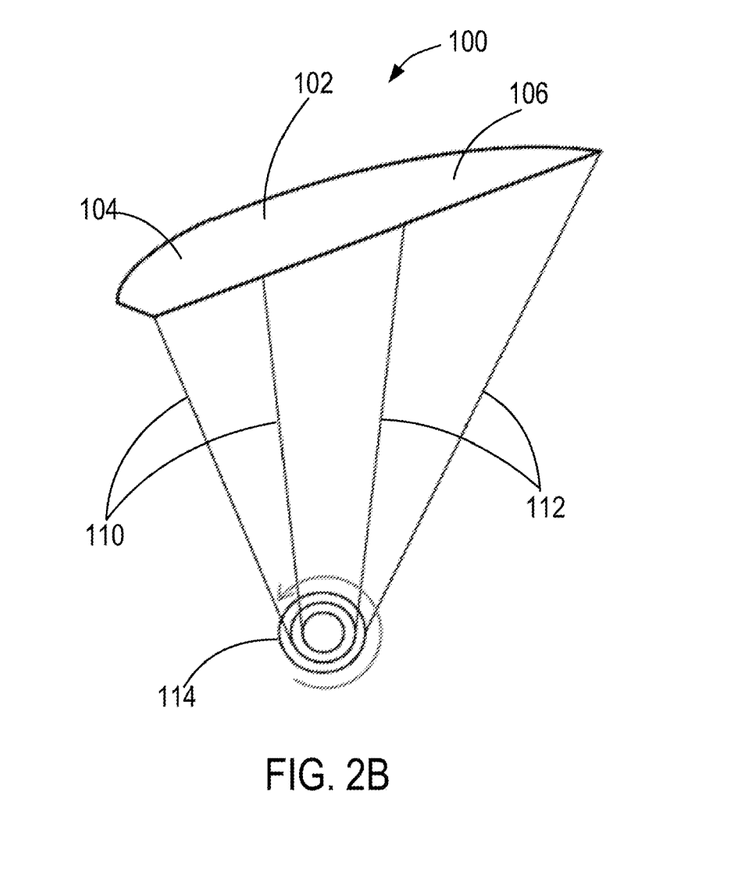
FIG. 2B shows a parafoil trimmed for low angle of attack during flight and FIG. 2C shows a parafoil trimmed for high angle of attack during flight.
Figure 2C:
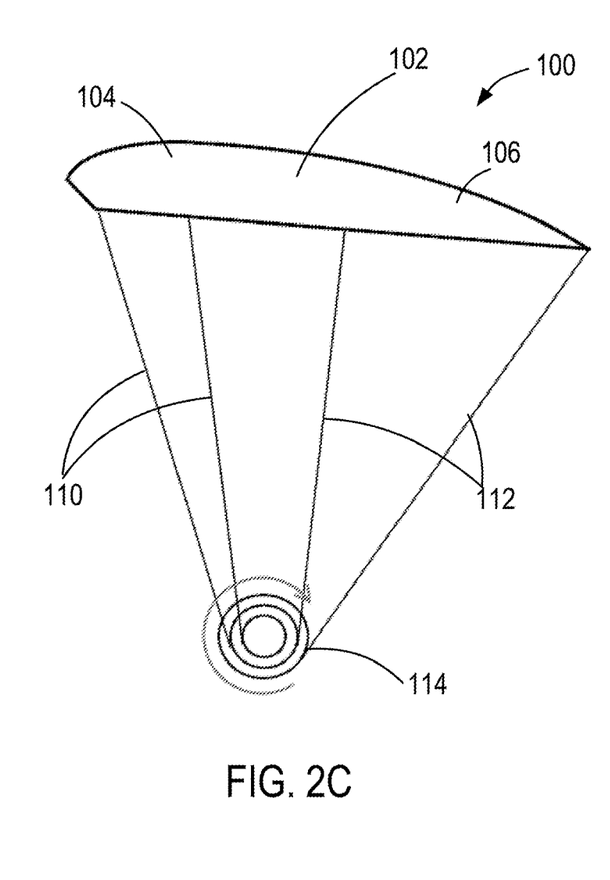

Referring now to FIGS. 2B and 2C, a trimmed parafoil system is described. As shown in FIG. 2B, parafoil system 100 may be trimmed for low angle of attack during flight. To achieve this, pulley cluster 114 is rotated, e.g., in a counterclockwise direction, such that forward suspension lines 110 are retracted and aft suspension lines 112 are extended. This causes the leading edge of canopy 102 to pitch downward, thereby decreasing the angle of attack of canopy 102 as described above. As canopy 102 is trimmed to a lower angle of attack, the lift of parafoil system 100 will decrease, thereby increasing the glide slope of parafoil system 100. As a result, the descent speed of parafoil system 100 will increase. As shown in FIG. 2C, parafoil system 100 may be trimmed for high angle of attack during flight. Pulley cluster 114 is rotated, e.g., in a clockwise direction, such that aft suspension lines 112 are retracted and forward suspension lines 110 are extended. This causes the leading edge of canopy 102 to pitch upward, thereby increasing the angle of attack of canopy 102. As canopy 102 is trimmed to a higher angle of attack, the lift of parafoil system 100 will increase, thereby decreasing the glide slope of parafoil system 100. As a result, the descent speed of parafoil system 100 will decrease.

Figure 3:
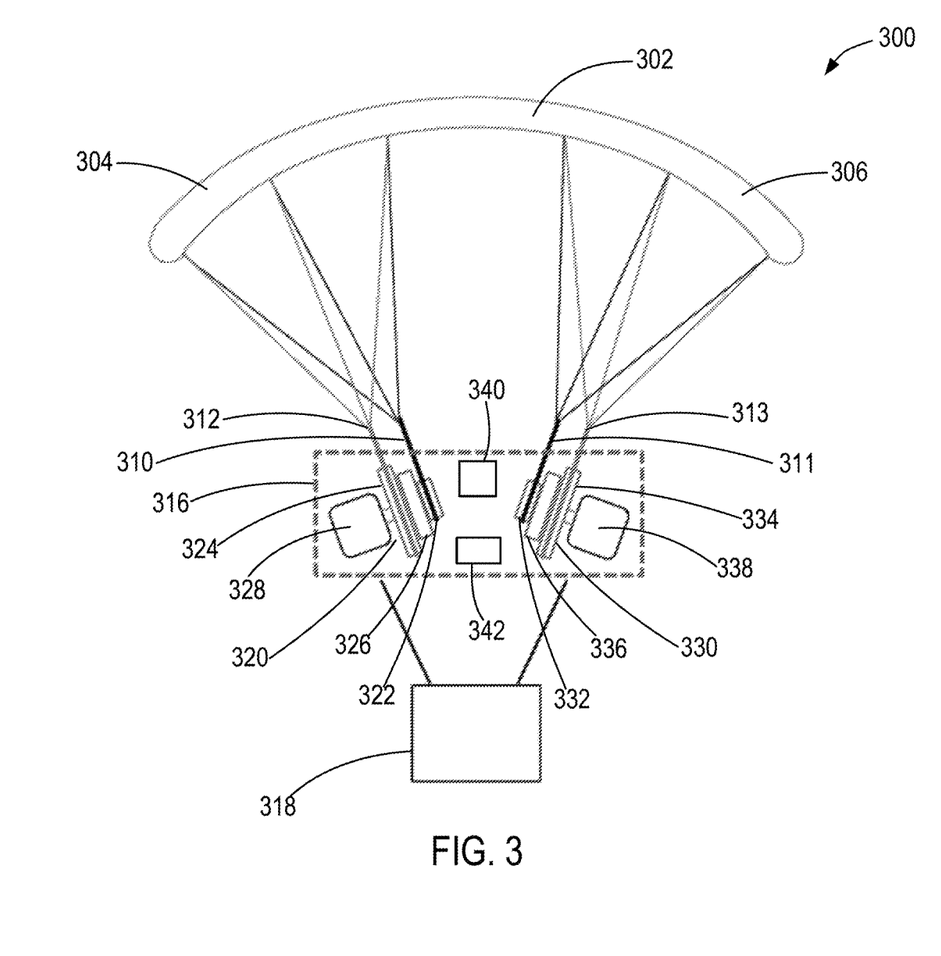
FIG. 3 shows a front view of the parafoil of FIG. 1.

Referring now to FIG. 3, an exemplary parafoil system for adjusting a trim angle during flight to control glide slope and descent speed of a parafoil is described. FIG. 3 illustrates a front view of the exemplary parafoil system 300. Parafoil system 300 is constructed similarly to parafoil system 100 of FIG. 1. For example, canopy 302 of FIG. 3 corresponds to canopy 102 of FIG. 1, housing 316 of FIG. 3 corresponds to housing 116 of FIG. 1, and payload 318 of FIG. 3 corresponds to payload 118 of FIG. 1. As shown in FIG. 3, canopy 302 may include right portion 304 and left portion 306. In addition, the forward suspension lines include right forward suspension lines 310 and left forward suspension lines 311, and the aft suspension lines include right aft suspension lines 312 and left aft suspension lines 313. Right forward suspension lines 310 and right aft suspension lines 312 may be coupled to right portion 304 of canopy 302, and left forward suspension lines 311 and left aft suspension lines 313 may be coupled to left portion 306 of canopy 302 to provide canopy 302 an anhedral shape during flight. Specifically, right forward suspension lines 310 may be coupled to the right forward portion of canopy 302, right aft suspension lines 312 may be coupled to the right aft portion of canopy 302, left forward suspension lines 311 may be coupled to the left forward portion of canopy 302, and left aft suspension lines 313 may be coupled to the left aft portion of canopy 302.

As shown in FIG. 3, parafoil system 300 may include two or more pulley clusters. For example, parafoil system 300 may include right pulley cluster 320 and left pulley cluster 330. Right pulley cluster 320 and left pulley cluster 330 may both be constructed similarly to pulley cluster 114 of FIG. 1. Right pulley cluster 320 may include first variable trim pulley 322, second variable trim pulley 324, and third variable trim pulley 326. As will be understood by one of ordinary skill in the art, right pulley cluster 320 may include more or less than three variable trim pulleys. First variable trim pulley 322, second variable trim pulley 324, and third variable trim pulley 326 may each have a different diameter. For example, first variable trim pulley 322 may have a diameter smaller than second variable trim pulley 324 and third variable trim pulley 326, and second variable trim pulley 324 may have a diameter larger than first variable trim pulley 322 and third variable trim pulley 326. As described above, the specific diameters of each individual variable trim pulley may be selected based on the amount of tension experienced by the suspension line coupled to the respective pulley. Similarly, left pulley cluster 330 may include first variable trim pulley 332, second variable trim pulley 334, and third variable trim pulley 336. As will be understood by one of ordinary skill in the art, left pulley cluster 330 may include more or less than three variable trim pulleys. First variable trim pulley 332, second variable trim pulley 334, and third variable trim pulley 336 may each have a different diameter. For example, first variable trim pulley 332 may have a diameter smaller than second variable trim pulley 334 and third variable trim pulley 336, and second variable trim pulley 334 may have a diameter larger than first variable trim pulley 332 and third variable trim pulley 336. As described above, the specific diameters of each individual variable trim pulley may be selected based on the amount of tension experienced by the suspension line coupled to the respective pulley.

In a preferred embodiment, first variable trim pulley 322, second variable trim pulley 324, and third variable trim pulley 326 may be fused together such that first variable trim pulley 322, second variable trim pulley 324, and third variable trim pulley 326 rotate as a single unit. Accordingly, first variable trim pulley 322, second variable trim pulley 324, and third variable trim pulley 326 will be rotated at the same angular velocity, i.e., the rate of change of angular position of the rotating body, but will each have a respective linear velocity. The linear velocity of each variable trim pulley is equal to the angular velocity multiplied by the respective radius. In addition, the linear velocity of each variable trim pulley is equal to the rate at which the respective suspension line retracts or extends from the respective pulley. Similarly, first variable trim pulley 332, second variable trim pulley 334, and third variable trim pulley 336 may be fused together such that first variable trim pulley 332, second variable trim pulley 334, and third variable trim pulley 336 rotate as a single unit.

Right forward suspension lines 310 and right aft suspension lines 312 are coupled to right pulley cluster 320 to control rig angle of right portion 304 of canopy 302, and left forward suspension lines 311 and left aft suspension lines 313 are coupled to left pulley cluster 330 to control rig angle of left portion 306 of canopy 302. As the center of pressure of canopy 302 tends to be forward of the midpoint of canopy 302, the right aft suspension lines 312 and left aft suspension lines 313 will have less tension than right forward suspension lines 310 and left forward suspension lines 311. Accordingly, right forward suspension lines 310 may be coupled to first variable trim pulley 322, and right aft suspension lines 312 may be coupled to second variable trim pulley 324, such that right forward suspension lines 310 is retracted or extended at a slower rate, e.g., linear velocity, than right aft suspension lines 312 for a given angular velocity of rotating right pulley cluster 320. Similarly, left forward suspension lines 311 may be coupled to first variable trim pulley 332, and left aft suspension lines 313 may be coupled to second variable trim pulley 334, such that left forward suspension lines 311 is retracted or extended at a slower rate, e.g., linear velocity, than left aft suspension lines 313 for a given angular velocity of rotating left pulley cluster 330. As will be understood by one skilled in the art, additional suspension lines coupled to right portion 304 of canopy 302 between the leading edge and the trailing edge of canopy 302 may be coupled to third variable trim pulley 326, and additional suspension lines coupled to left portion 306 of canopy 302 between the leading edge and the trailing edge of canopy 302 may be coupled to third variable trim pulley 336 (not shown). As a result, a torsional balance on each of right pulley cluster 320 and left pulley cluster 330 may be achieved, and pulley cluster 320 and pulley cluster 330 may be rotated without requiring large torques from motors 328 and 338.

Housing 316 may be sized and shaped to house right pulley cluster 320, left pulley cluster 330, motors 328 and 338, processor 340, power source 342, and instrumentation that may include an accelerometer, gyroscope, magnetometer, global positioning system, barometric altimeter, or other instruments, operatively coupled to processor 340. Power source 342, e.g., a battery, delivers power to motors 328 and 338. Motor 328 may be coupled to right pulley cluster 320 such that motor 328 rotates right pulley cluster 320, and motor 338 may be coupled to left pulley cluster 330 such that motor 338 rotates left pulley cluster 330. Processor 340 includes a memory and a non-transitory readable medium having instructions that when executed by processor 340, cause motor 328 to rotate right pulley cluster 320 and/or motor 338 to rotate left pulley cluster 330. For example, motor 328 and motor 338 may be instructed to operate in unison such that right pulley cluster 320 and left pulley cluster 330 are rotated with the same angular velocity, and right forward suspension lines 310 and right aft suspension lines 312, and left forward suspension lines 311 and left aft suspension lines 313 are retracted and extended to adjust the trim angle of right portion 304 and left portion 306 of canopy 302 equally. In another embodiment, motor 328 and motor 338 may be instructed to operate differentially such that right pulley cluster 320 and left pulley cluster 330 are rotated with differing angular velocities, and right forward suspension lines 310 and right aft suspension lines 312, and left forward suspension lines 311 and left aft suspension lines 313 are retracted and extended to adjust the trim angle of right portion 304 and left portion 306 of canopy 302 differentially to steer parafoil system 300.

As described above, in one embodiment, the individual variable trim pulleys of right pulley cluster 320 and left pulley cluster 330 may be spaced apart and rotated at the same angular velocity. For example, motor 328 may be individually coupled to first variable trim pulley 322, second variable trim pulley 324, and third variable trim pulley 326 such that first variable trim pulley 322, second variable trim pulley 324, and third variable trim pulley 326 may be spaced apart within or outside of housing 316, and motor 328 may be instructed to rotate each variable trim pulley at the same angular velocity. Similarly, motor 338 may be individually coupled to first variable trim pulley 332, second variable trim pulley 334, and third variable trim pulley 336 such that first variable trim pulley 332, second variable trim pulley 334, and third variable trim pulley 336 may be spaced apart within or outside of housing 316, and motor 338 may be instructed to rotate each variable trim pulley at the same angular velocity.

In yet another embodiment, the individual variable trim pulleys of right pulley cluster 320 and left pulley cluster 330 may each be rotated at different angular velocities. For example, motor 328 may be individually coupled to first variable trim pulley 322, second variable trim pulley 324, and third variable trim pulley 326 such that first variable trim pulley 322, second variable trim pulley 324, and third variable trim pulley 326 may be smaller and have similar diameters, and motor 328 may be instructed to rotate each variable trim pulley at different angular velocities. Similarly, motor 338 may be individually coupled to first variable trim pulley 332, second variable trim pulley 334, and third variable trim pulley 336 such that first variable trim pulley 332, second variable trim pulley 334, and third variable trim pulley 336 may be smaller and have similar diameters, and motor 338 may be instructed to rotate each variable trim pulley at different angular velocities.

Figure 4:
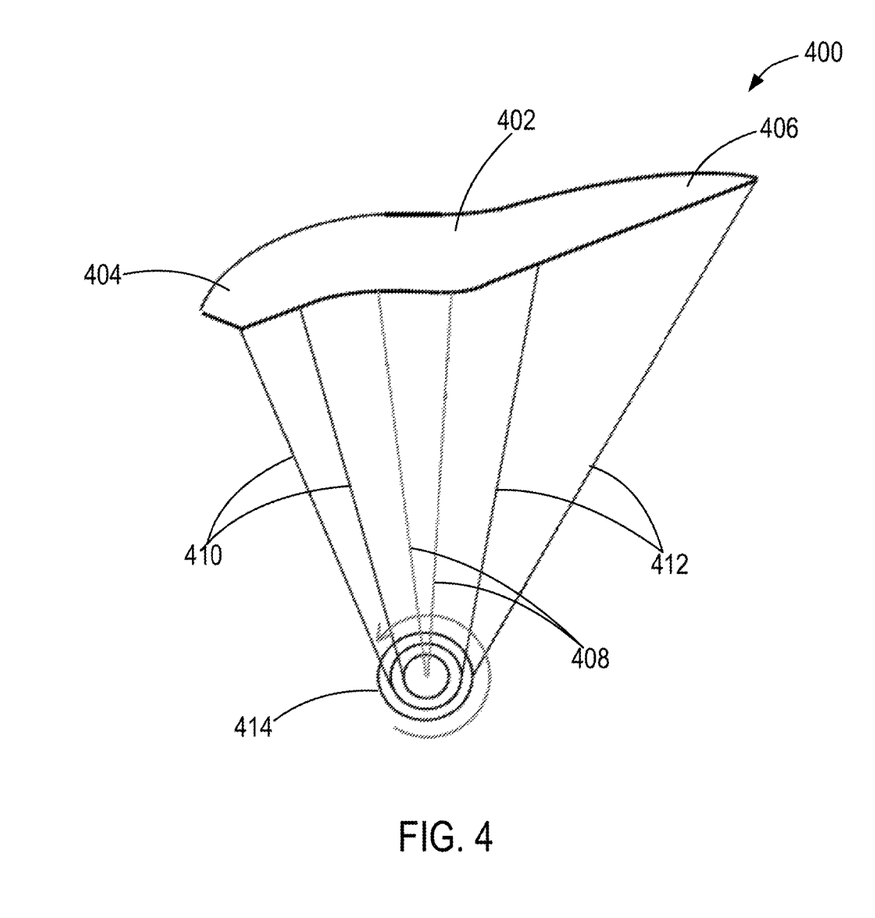
FIG. 4 illustrates another exemplary parafoil system with some suspension lines connected to a fixed point.

Referring now to FIG. 4, another exemplary parafoil system with some suspension lines connected to a fixed point is described. Parafoil system 400 is constructed similarly to parafoil system 100 of FIG. 1 and parafoil system 300 of FIG. 3. For example, canopy 402 of FIG. 4 corresponds to canopy 102 of FIG. 1 and canopy 302 of FIG. 3, forward suspension lines 410 of FIG. 4 corresponds to forward suspension lines 110 of FIG. 1, aft suspension lines 412 of FIG. 4 corresponds to aft suspension lines 112 of FIG. 1, and pulley cluster 414 of FIG. 4 corresponds to pulley cluster 114 of FIG. 1. Parafoil system 400 differs in that additional suspension lines 408 coupled to canopy 402 in between the leading edge and the trailing edge of canopy 402 are connected to a fixed point, e.g., the axle of pulley cluster 414 or the structure to which pulley cluster 414 is mounted thereon. As shown in FIG. 4, parafoil system 400 may be trimmed for low angle of attack during flight. Pulley cluster 414 is rotated, e.g., in a counter-clockwise direction, such that forward suspension lines 410 are retracted and aft suspension lines 412 are extended. This causes the leading edge of canopy 402 to pitch downward, thereby decreasing the angle of attack of canopy 402 as described above. As canopy 402 is trimmed to a lower angle of attack, the lift of parafoil system 400 will decrease, thereby increasing the glide slope of parafoil system 400. As a result, the descent speed of parafoil system 400 will increase.

In one embodiment, at least one of the suspension lines of forward suspension lines 410 or aft suspension lines 412 in the region of canopy 402 near the center of pressure of may be connected to a fixed point, e.g., the payload directly. This would result in reducing the overall load on pulley cluster 414.

Although the foregoing has included detailed descriptions of some embodiments by way of illustration and example, it will be readily apparent to those of ordinary skill in the art in light of the teachings of these embodiments that numerous changes and modifications may be made without departing from the spirit or scope of the appended claims.

What is claimed:

1. A parafoil system having an adjustable trim angle during flight to control glide slope and descent speed of a parafoil, the system comprising:
    a canopy having a forward portion and an aft portion;
    a forward suspension line coupled to the forward portion;
    an aft suspension line coupled to the aft portion;
    first and second pulleys configured to rotate as a single unit, wherein the first pulley has a first diameter and the second pulley has a second diameter larger than the first diameter, wherein the forward suspension line is coupled to the first pulley, and wherein the aft suspension line is coupled to the second pulley;
    an additional suspension line coupled to one of the forward portion of the canopy or the aft portion of the canopy, wherein the additional suspension line is further coupled to an axle of the first pulley and the second pulley; and
    a motor coupled to the first and second pulleys, wherein the motor rotates the first and second pulleys to extend or retract the forward suspension line and the aft suspension line to adjust a trim angle of the canopy during flight,
    wherein the first and second pulleys and the motor are mounted on a structure.

2. The system of claim 1, wherein the motor is configured to rotate the first pulley at a first speed and to rotate the second pulley at a second speed, and wherein the first speed and the second speed are different.

3. The system of claim 1, further comprising a housing configured to house the first and second pulleys and the motor.

4. The system of claim 1, further comprising a power source operatively coupled to the motor, the power source configured to power the motor.

5. The system of claim 1, further comprising a processor operatively coupled to the motor, and a non-transitory computer readable medium having instructions stored thereon, wherein the instructions, when executed by the processor, cause the motor to rotate the first and second pulleys.

6. The system of claim 5, further comprising at least one of an accelerometer, gyroscope, magnetometer, global positioning system, or barometric altimeter, operatively coupled to the processor.

7. The system of claim 1, wherein the structure is mounted on a payload.

8. The system of claim 1, wherein at least one of the forward or aft suspension lines closest to a center of pressure of the canopy is coupled to the structure.

9. The system of claim 1, further comprising a third pulley having a third diameter, wherein the third diameter is larger than the first diameter and smaller than the second diameter.

10. The system of claim 9, wherein at least one of the forward suspension line or the aft suspension line is coupled to the third pulley.

11. The system of claim 1, wherein the motor rotates the first and second pulleys to extend or retract a forward suspension line or an aft suspension line, coupled to a left side of the canopy, to adjust the trim angle of the left side of the canopy during flight.

12. The system of claim 11, further comprising a second motor coupled to third and fourth pulleys, wherein the second motor rotates the third and fourth pulleys to extend or retract a forward suspension line or an aft suspension line, coupled to a right side of the canopy, to adjust the trim angle of the right side of the canopy during flight.

13. The system of claim 12, wherein the motor and the second motor are configured to operate in unison to adjust the trim angle of the right and the left sides of the canopy equally.

14. The system of claim 12, wherein the motor and the second motor are configured to operate differentially to steer the parafoil.

15. A system for adjusting a trim angle during flight to control glide slope and descent speed of a parafoil, the system comprising: a canopy having a forward portion and an aft portion; a forward suspension line coupled to the forward portion; an aft suspension line coupled to the aft portion;
    first and second pulleys coupled to suspension lines of the parafoil, wherein the first pulley has a first diameter and the second pulley has a second diameter greater than the first diameter, wherein the forward suspension line of the parafoil is coupled to the first pulley, and wherein the aft suspension line of the parafoil is coupled to the second pulley;
    an additional suspension line coupled to one of the forward portion of the canopy or the aft portion of the canopy, wherein the additional suspension line is further coupled to an axle of the first pulley and the second pulley;
    a motor coupled to the first and second pulleys; and
    a processor operatively coupled to the motor, wherein the processor causes the motor to rotate the first and second pulleys to extend or retract the suspension lines to adjust the trim angle during flight.

* * * * *